United States Patent [19]

Hill

[11] Patent Number: 4,682,628

[45] Date of Patent: Jul. 28, 1987

[54] FAUCET SYSTEM

[76] Inventor: Stephen A. Hill, 8 Heatherbrae Avenue, South Caulfield, Victoria, Australia

[21] Appl. No.: 690,194

[22] PCT Filed: Apr. 11, 1984

[86] PCT No.: PCT/AU84/00056

§ 371 Date: Dec. 13, 1984

§ 102(e) Date: Dec. 13, 1984

[87] PCT Pub. No.: WO84/04145

PCT Pub. Date: Oct. 25, 1984

[30] Foreign Application Priority Data

Apr. 13, 1983 [AU] Australia .............................. PF8861
Aug. 30, 1983 [AU] Australia .............................. PG1144

[51] Int. Cl.⁴ ............................................ F16K 31/02
[52] U.S. Cl. .................... 137/624.11; 4/623; 251/129.04
[58] Field of Search ................. 4/623; 137/624.11; 251/129.04, 129.15

[56] References Cited

U.S. PATENT DOCUMENTS

| | | |
|---|---|---|
| 2,776,812 | 1/1957 | Colendar . |
| 3,038,347 | 6/1962 | Sloan et al. . |
| 3,151,340 | 10/1964 | Teshima . |
| 3,273,919 | 9/1966 | Billeter et al. . |
| 3,327,992 | 6/1967 | Billeter et al. . |
| 3,334,646 | 8/1967 | Billeter et al. . |
| 3,399,860 | 9/1968 | Billeter et al. . |
| 3,415,278 | 12/1968 | Yamamoto et al. . |
| 3,487,477 | 1/1970 | Classen . |
| 3,491,381 | 1/1970 | Cathcart . |
| 3,505,692 | 4/1970 | Forbes . |
| 3,551,919 | 1/1971 | Forbes . |
| 3,556,137 | 1/1971 | Billeter . |
| 3,585,652 | 6/1971 | Forbes et al. . |
| 3,638,680 | 2/1972 | Kopp .......................... 251/129.04 X |
| 4,309,781 | 1/1982 | Lissau . |
| 4,398,310 | 8/1983 | Lienhard . |
| 4,402,095 | 9/1983 | Pepper . |

FOREIGN PATENT DOCUMENTS

| | | |
|---|---|---|
| 51301 | 7/1984 | Australia . |
| 1944165 | 3/1971 | Fed. Rep. of Germany . |
| 2513737 | 10/1975 | Fed. Rep. of Germany . |
| 3100773 | 11/1981 | Fed. Rep. of Germany . |
| 3212469 | 10/1983 | Fed. Rep. of Germany . |
| 504185 | 4/1939 | United Kingdom . |
| 1302821 | 1/1973 | United Kingdom . |

Primary Examiner—Robert G. Nilson
Attorney, Agent, or Firm—Roylance, Abrams, Berdo & Goodman

[57] ABSTRACT

A sensing and valve operating mechanism for remotely controlling a faucet can be used with an anti-scald faucet valve and can be provided on a faucet by a kit. The mechanism senses the presence of an object near a faucet outlet, energizes a solenoid in response to the presence of an object, and calculates the time when the solenoid is energized. Energy is removed from the solenoid after a predetermined time interval notwithstanding that the presence of an object is still being sensed. The solenoid cannot be re-energized until after the object is removed from near the faucet outlet.

13 Claims, 10 Drawing Figures

4,682,628

FAUCET SYSTEM

The invention relates to faucets and in one particular embodiment those which turn off and on automatically.

Faucets have assumed various shapes and configurations over many years. The most basic of these comprises a plurality of taps with associated interdependent valve mechanisms. One tap is connected to a cold water supply whilst another is connected to a hot water supply. Typically each of the taps has its own outlet.

Modifications of this basic design have occurred to enable the use of a single outlet by connecting the respective outlets of the taps to a central outlet. This permits a blending or mixing of hot water and cold water thus facilitating a wide temperature range of issuing water. Notwithstanding such modification it is still necessary to manually adjust each flow of hot and cold water.

According to another improvement of the conventional faucet, there has been provided means to turn the water flow off and on automatically or remotely (e.g. by the foot). In the former case the automatic operation has in one case been achieved by providing a spring loaded return device in the valve mechanism. This permits the flow of water to be manually initiated and the water valve to shut under the action of the spring after a predetermined period.

A more sophisticated automatic system has been proposed in Australian patent application No. 81718/72 which discloses an ultrasonically operated water faucet. The water faucet is provided which has an ultrasonic sensor to sense the user's hand or an object that is within proximity of the faucet. The ultrasonic sensor is connected to a control circuit that activates an electrically controlled valve. When the user's hand is brought under the faucet the water is turned on and remains on for as long as the user's hand is under the faucet. When the user's hand is removed, the water is shut off, thus ensuring no more water than is necessary is used.

The automatic faucet of the aforementioned type is particularly suitable for public lavatories when for sanitary reasons contact with faucets is not desirable. Further such system prevents wastage of water due to faucets being left on.

Nevertheless in all these devices the regulation of water at an appropriate temperature is complicated in view of the usual high pressure differential between incoming hot and cold water and it is common for such mixing devices to leak. This leakage can interfere with the mixing capabilities of these mechanisms.

Furthermore, some known faucet systems suffer from the disadvantage that they initially deliver scalding hot water, which can cause considerable injury if the user is not aware of this disadvantage.

It is an object of this invention to provide an anti-scald faucet system.

A further object of the invention is the provision of electrical means to safely operate a faucet system by remote control.

In accordance with one aspect of this invention, there is provided an anti-scald faucet valve comprising (a) an elongated valve chamber having a side wall and first and second end walls, the side wall having spaced apart hot and cold water inlet ports, the cold water inlet port being nearest the first end wall, (b) an elongate valve member movable in said chamber and having first and second valve closure members arranged to open and close the cold and hot water inlet ports respectively, and defining a first end zone and second end zone between the first and second end walls and said valve closure members respectively, and a mixing zone between the first and second valve closure members, (c) means biassing the valve member towards the second end wall, (d) a metering orifrce through the second valve closure member communicating the mixing zone with the second end zone, (e) a faucet outlet chamber having an outlet and communicating with the mixing zone by a main passage which is opened or closed by a remotely controlled valve, and (f) a regulating passage communicating the faucet outlet chamber with the first end zone, said regulating passage having a regulating valve to control the flow of water between the first end zone and the faucet chamber, thereby controlling the movement of said elongate valve member in said valve chamber relative to the cold and hot water inlet ports.

Preferably the faucet outlet chamber includes a constriction.

Preferably the faucet outlet chamber additionally communicates with the first end zone through a by-pass passage incorporating a second constriction.

Preferably the side wall is cylindrical and the elongate valve member is cylindrical.

Preferably the elongate valve member comprises two bobbins connected via a first shaft.

Preferably the biassing means is a spring.

Distinct from the above is the question whether water is to flow automatically or not. Known devices of this type have incorporated timers to stop water flow after a predetermined period. However, they are further characterized by means to continue the flow, overriding the timer, if the object is still near the faucet. This has the disadvantage that water may continue to flow if objects are left near the faucet or actuation means. It is an object of a second aspect of the invention to alleviate this potential problem.

In accordance with the second aspect of this invention which is quite separate from the first aspect though usable in combination therewith, there is provided a sensing and valve operating means comprising (a) means to sense the presence of an object near the faucet outlet, (b) means to energise a solenoid in response to the presence of said object, (c) means to calculate the time when the solenoid is energised, and (d) means to remove the energy from said solenoid after a predetermined time interval, notwithstanding that the means to serve the presence of an object is still operative.

Preferably the sensing means comprises a light emitting diode (LED) driven by a pulse generator, and a light detector driven in synchronism with said LED to detect only the pulses reflected by the object from the LED. Preferably the LED and detector operate in the infra-red wavelength range to reduce false triggering by extraneous natural light.

Conveniently, the detected pulses are counted by a counting circuit until a predetermined time interval has lapsed, when power to the solenoid is switched off.

Preferably the light emitting from the light emitting diode has a peak emission wavelength of 940 mm.

Preferably the light detector has a spectral response in the range 590–980 mm.

Preferably the detected pulses are amplified and filtered, prior to energising the solenoid and calculating the time of energisation of the solenoid.

Clearly the above describe means may constitute the means to operate the anti-scald faucet previously referred to. It is to be understood however that such a combined use is merely preferred.

Again, quite separate from the above, the use of light emission and sensing devices to initiate water flow has been inhibited by the relatively high cost to changeover from existing manual systems. It is therefore the object of a third aspect of the invention to provide an adaptor kit which permits ready adaption of existing faucets.

According to a further aspect of this invention, there is provided an adaptor kit to convert a standard faucet to a sensing faucet, said kit comprising:

(a) an eye body having sensing means for triggering a valve operating circuit when an object is placed near the sensing means, (b) an elongate cylindrical adaptor sleeve arranged to pass through the eye body and, in situ, through a mounting station, the sleeve being externally threaded to accept a nut for fixing of the eye body to the mounting station, and further including ends adapted to receive standard faucet and standard pipe fittings.

Preferably the externally threaded sleeve has diameter substantially less than that provided in the mounting station, to enable electrical wires to clearly pass therebetween.

Preferably the sleeve is provided with a keyway extending at least a portion of the length of the sleeve to enable the electrical wires to pass therethrough.

Preferably a washer is provided for inclusion between the mounting station and nut, the washer having an aperture, the diameter of which exceeds the diameter of the sleeve to enable the sleeve to pass therethrough, and a keyway to enable electrical wire, passing through the mounting station, to pass traversely of the sleeve.

The invention is further illustrated with reference to the drawings in which:

FIGS. 4 and 4A are insitu and component diagrams of the third aspect of the invention.

FIGS. 5, 5A, 5B, 5C and 5D are insitu and component diagrams of an alternate form of the third aspect of the invention.

Figure 1:
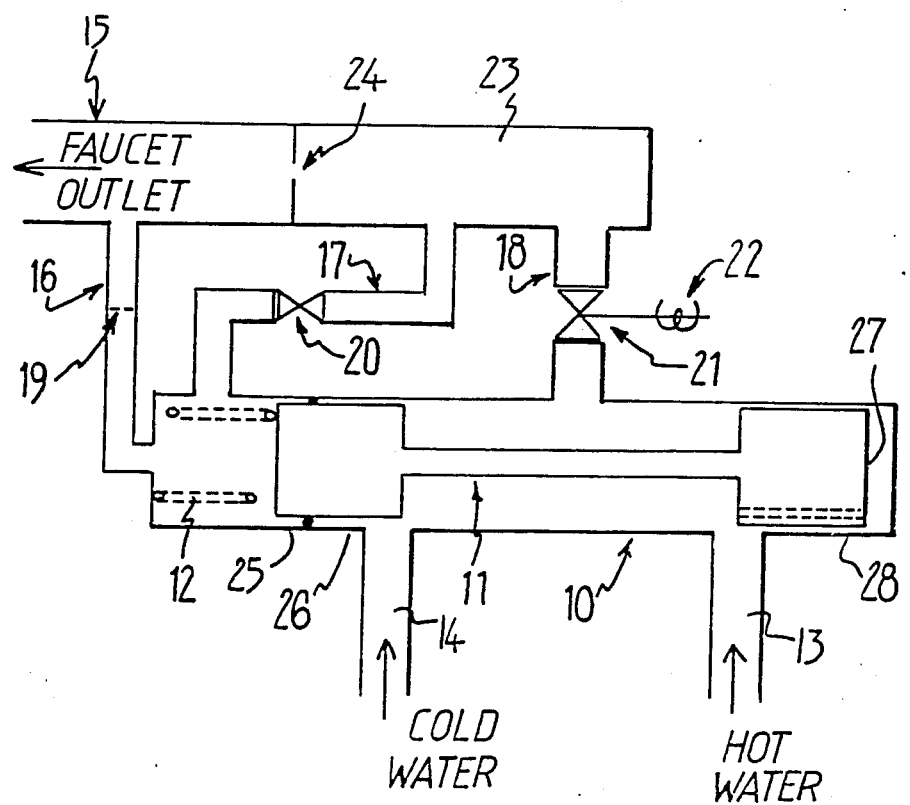
FIG. 1 is a diagram of the anti-scald faucet valve according to the first aspect of the invention.

The anti-scald faucet shown in FIG. 1 comprises a valve chamber 10 containing a valve member 11 therein. Coil spring 12 forces the valve member to the right. Valve chamber 10 provided with hot and cold water inlets 13 and 14. Valve chamber 10 communicates with faucet outlet 15 through three passages 16, 17 and 18. By-pass passage 16 includes a constriction 19. Regulating passage 17 includes a regulating valve 20, which may be either manually or thermostatically operated. Main passage 18 includes a solenoid operated valve 21 operated when solenoid 22 is energised. Valve 21 is either open or shut; it has no intermediate setting. Faucet outlet chamber 23, between the inlet ports for passages 16 and 17 is provided with a constriction 24. An "O"-ring 25 seals the cold water bobbin 26 of valve member 11 against valve chamber 10, whilst the hot water bobbin 27 of the valve chamber is provided with a metering orifice 28.

When solenoid valve 21 is closed, water pressure forces valve bobbin 26 against the force of spring 12, because any pressure onthe left hand end of the valve chamber 10 is relieved through constriction 19. When water is flowing through the faucet, regulating valve 20 can vary the water pressure on bobbin 26 depending on the amount of opening of valve 20, due to the differential pressure generated across constriction 24. If pressure on bobbin 26 is low, the bobbin will move to admit cold water from inlet 14 to valve chamber 10, and if the pressure is high, will with assistance of spring 12 move the bobbin to the right to admit hot water from inlet 13. Control is infinite between full cold or full hot water.

Metering orifice 28 restricts the flow of water to the right hand and of valve chamber 10, so the rate of movement of bobbin 11 is reduced, depending on the size of orifice 28.

When there is no flow through the valve, bobbin 11 will always be to the left, ready to pass cold water, irrespective of the setting of valve 20. When solenoid valve 21 opens, water will pass through the valve to faucet outlet 15, and depending on the setting of regulating valve 20, bobbin 11 will slowly move to adjust the hot and cold water flows to achieve the selected mixture.

Regardless of the temperature control setting, the faucet will always deliver cold water initially, and gradually warm up to reduce the dange of scalding.

A mannual by-pass valve could be provided parallel with the solenoid valve to permit mannual operation of the faucet in the event of power failure, or if extended continuous operation is required.

Figure 2:
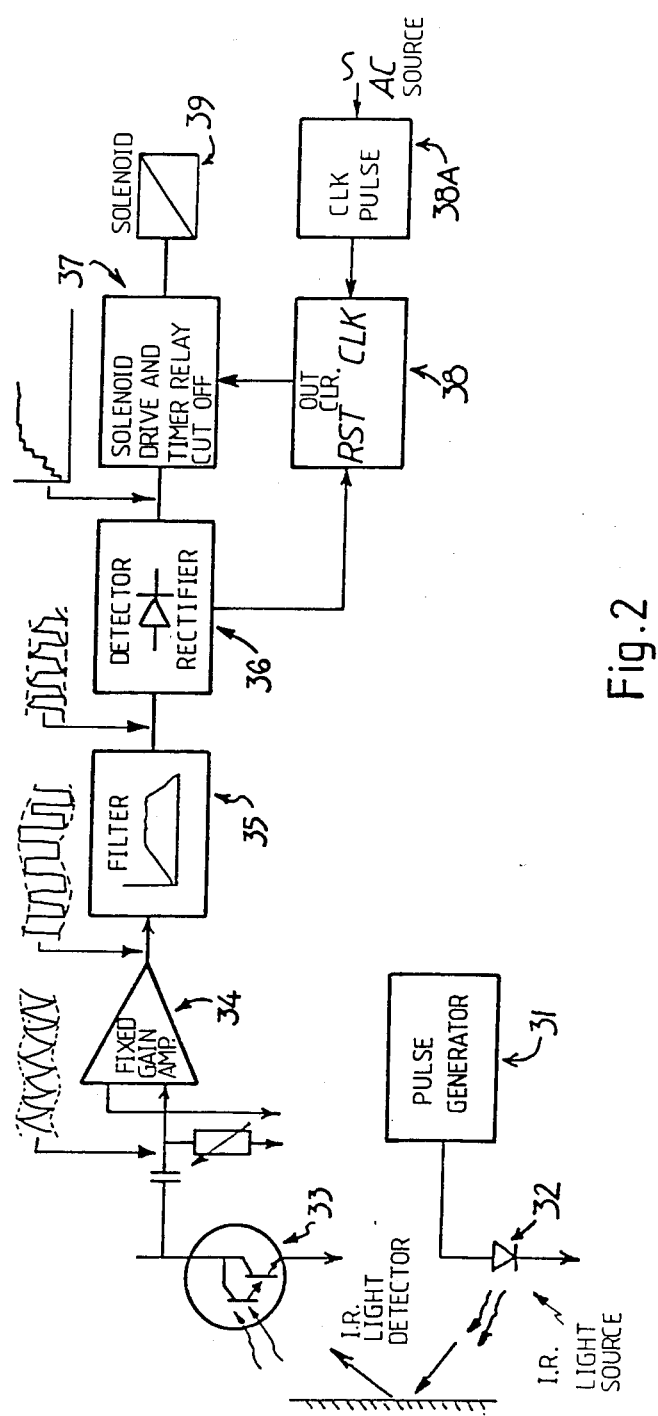
FIG. 2 is a block diagram of circuitry according to the second aspect of the invention.

Solenoid valve 21 can be operated as discussed hereinbefore, by remote control, using infrared sensing of any object near the faucet outlet to drive the electronic circuitry. FIG. 2 is a block diagram of the circuitry, and FIG. 3 as a circuit diagram.

Referring to FIG. 2, the circuitry comprises a square wave pluse generator 31 driving a light emitting diode 32 having a peak emission wavelength of 940 mm. The infrared pulses emitted by LED 32 is reflected from an object placed in the vicinity and detected by detector 33, having a spectral response in the range 590–980 mm. The pulses are amplified by fixed gain amplifier 34, and 50 Hz mm and fluorescent and incanclescent interference are removed by filter 35. The filtered pulses are detected by detector/rectifier 36 which triggers the solenoid driven circuit 37 and a timer 38 driven by clock circuit 38A. Driven circuit 37 operates solenoid 39 thereby opening or closing a valve, such as valve 21 shown in FIG. 1. Timer circuit 38 counts the number of pulses until a predetermined number corresponding to a predetermined time interval, for example 3 minutes. The solenoid 39 is then de-energised, shutting off the water supply. The faucet can only be re-started by removing and then replacing the object. It will be appreciated that in most cases, the object is a hand or hands.

Figure 4:
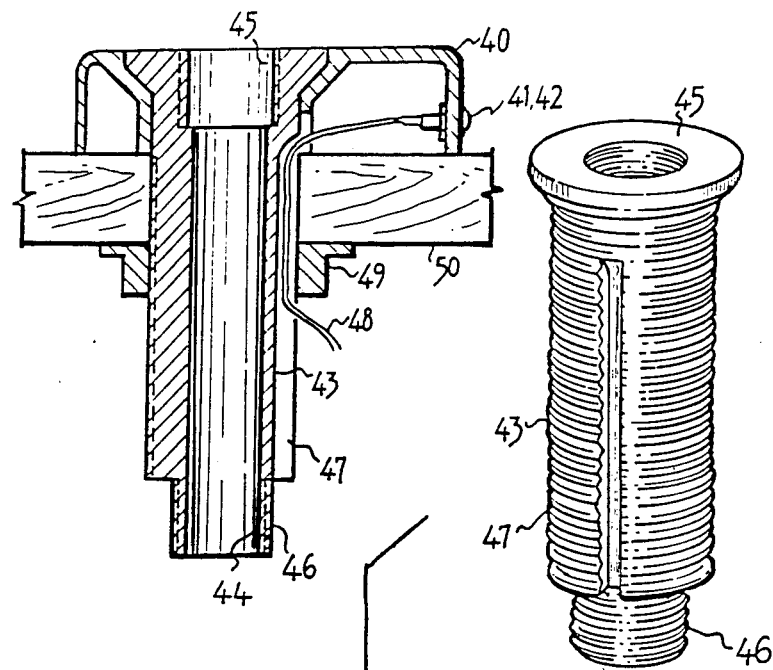
Figure 4:
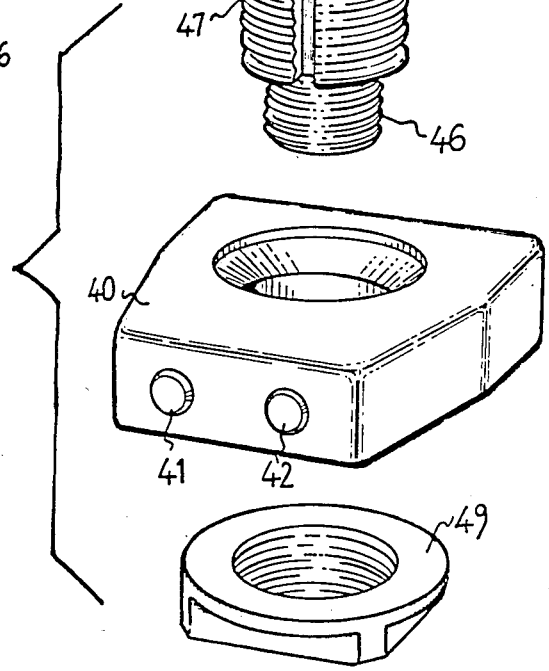

FIGS. 4 and 5 illustrates a faucet adaptor kit constructed in accordance with one aspect of this invention. The kit enables a standard faucet outlet to be converted to a remotely operated faucet. The kit comprises an eye body 40 moulded of plastics material, and arranged to carry the "eyes" of the remote control system, namely an infrared emitter and detector 41,42.

As shown in FIG. 4, the kit further comprises a sleeve 43 provided with a bore 44 threaded internally at its upper end 45 and externally at its lower end 46. Threaded ends 45,46 are the same size as the threaded portion of the existing faucet and nut, for example $\frac{1}{2}$" or $\frac{5}{8}$" B.S.P. Sleeve 43 is provided with a keyway 47 to accommodate wires 48 from the "eyes" 41,42 to the electrical circuitry, which may be the same as that described with reference to FIGS. 2 and 3. Nut 49 enables the adaptor kit to be mounted.

To assemble the adaptor kit, the existing faucet is first removed from bench 50 by loosening off the pipe nut underneath the bench. Sleeve 43 is fitted inside the eye body 40 and the assembly is fitted through the hole in the bench (enlarged to accommodate the larger diameter of sleeve 43). Wires 48 are fed through the keyway 47 as shown, and nut 49 is then tightened. The original faucet is then attached to threaded bore 45, and the original pipe nut is screwed onto the threaded section 46.

As shown in FIG. 5, an alternative sleeve 51 of constant cross-section is used. In doing so conventional pumping pipe can be used for its fabrication. Threaded ends 52 and 53 are provided to correspond with threaded portions on the existing faucet and fittings. Whilst the same size hole as in FIG. 1 is utilized, due to the reduced diameter of sleeve 51 a passageway 54 is formed to enable wires 55 to pass therethrough. Washer 56 is assembled over sleeve 51 prior to attachment of nut 57. At least one open segment 58 is formed in washer 56 to enable wires 55 passing through passageway 54 to issue traversely of sleeve 51 for attachment to electrical circuitry.

Thus to assemble this alternate form of adaptor kit, the existing faucet is removed from bench 50 by loosening off the pipe nut underneath bench 50. Sleeve 51 is fitted inside the eye body 40 and the assembly is fitted through the hole in the bench. Wires 55 are fed through passageway 54 and open segment 58 of washer 56 inserted over sleeve 51. Nut 57 is then tightened on sleeve 51. Thereafter the original fittings are attached.

The claims defining the invention are as follows; I claim:

1. A sensing and valve operating means for remotely controlling a faucet, comprising:
   (a) means to sense the presence of an object near a faucet outlet,
   (b) means to energize a solenoid in response to the presence of the object,
   (c) means to calculate the time when the solenoid is energized,
   (d) means to remove the energy from the solenoid after a predetermined time interval, notwithstanding that the means to sense the presence of an object is sensing an object, and
   (e) means for rendering inoperative said means to energize until after the object is removed from near the faucet outlet.

2. An operating means according to claim 1 wherein the sensing means comprises a light emitting diode (LED) driven by a pulse generator, and a light detector driven in synchronism with said LED to detect only pulses reflected by the object from the LED.

3. An operating means according to claim 2 wherein the LED and detector operate in the infra-red wavelength range to reduce false triggering by extraneous natural light.

4. An operating means according to claim 2 wherein detected pulses are counted on a counting circuit until the predetermined time interval has elapsed.

5. An operating means according to claim 2 wherein light emitting from the light emitting diode has a peak emission wavelength of 940 mm.

6. An operating means according to claim 2 wherein said light detector has a spectral response in the range 590–980 mm.

7. An operating means according to claim 2 wherein the detected pulses are amplified and filtered, prior to energising the solenoid and calculating the time of energisation of the solenoid.

8. A sensing and valve operating means for remotely controlling a faucet, comprising:
   (a) means to sense the presence of an object near a faucet outlet, the sensing means including a light emitting diode (LED) driven by a pulse generator, and a light detector driven in synchronism with said LED to detect only pulses reflected by the object from the LED,
   (b) means to energize a solenoid in response to the presence of the object,
   (c) means to calculate the time when the solenoid is energized, and
   (d) means to remove the energy from the solenoid after a predetermined time interval, notwithstanding that the means to sense the presence of an object is still operative.

9. An operating means according to claim 8 wherein the LED and detector operate in the infra-red wavelength range to reduce false triggering by extraneous natural light.

10. An operating means according to claim 8 wherein detected pulses are counted on a counting circuit until the predetermined time interval has elapsed.

11. An operating means according to claim 8 wherein light emitting from the light emitting diode has a peak emission wavelength of 940 mm.

12. An operating means according to claim 8 wherein said light detector has a spectral response in the range 590–980 mm.

13. An operating means according to claim 8 wherein detected pulses are amplified and filtered, prior to energizing the solenoid and calculating the time of energization of the solenoid.

* * * * *

UNITED STATES PATENT AND TRADEMARK OFFICE
CERTIFICATE OF CORRECTION

PATENT NO. : 4,682,628

DATED : July 28, 1987

INVENTOR(S) : Stephen A. Hill

Figure 3A:
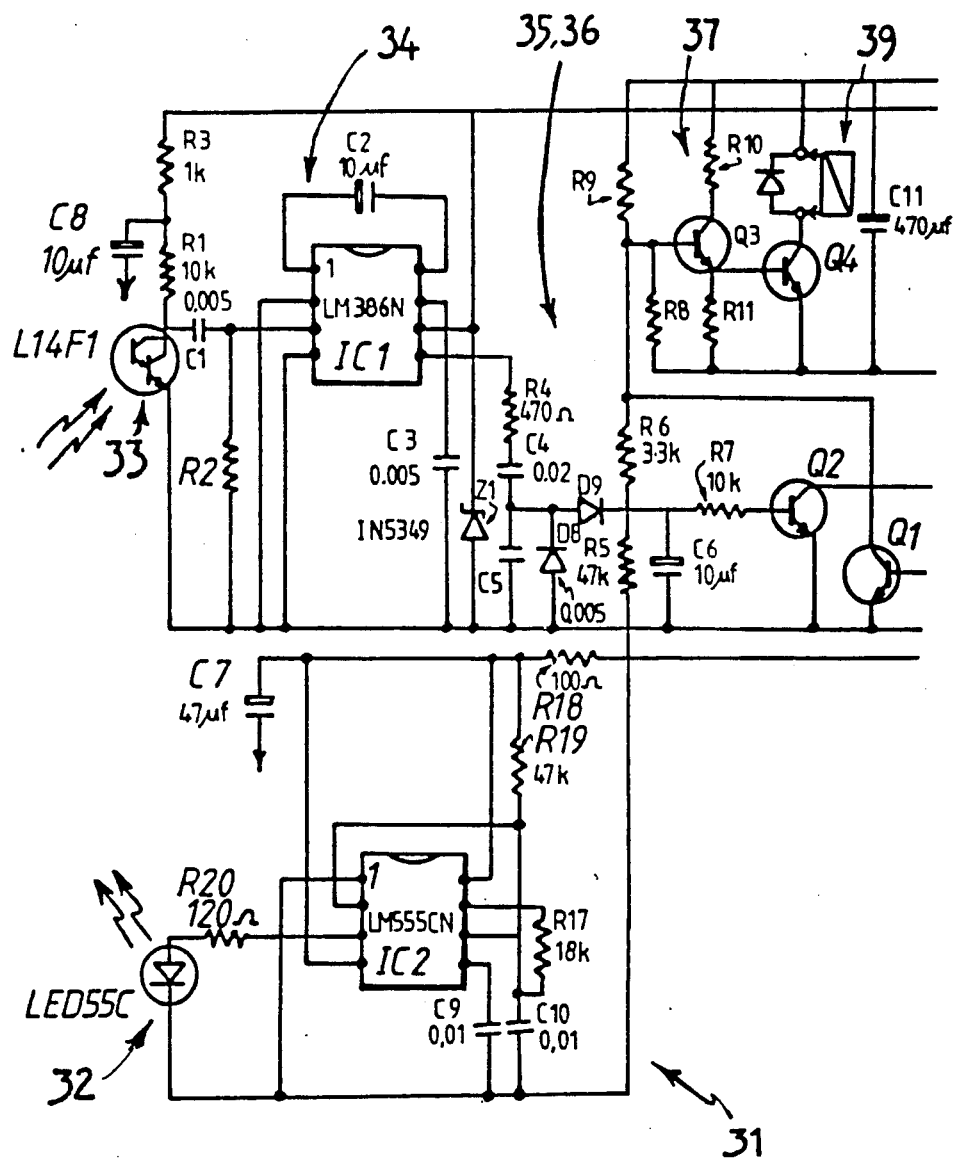
FIG. 3 is a circuit diagram according to the second aspect of the invention.
Figure 3B:
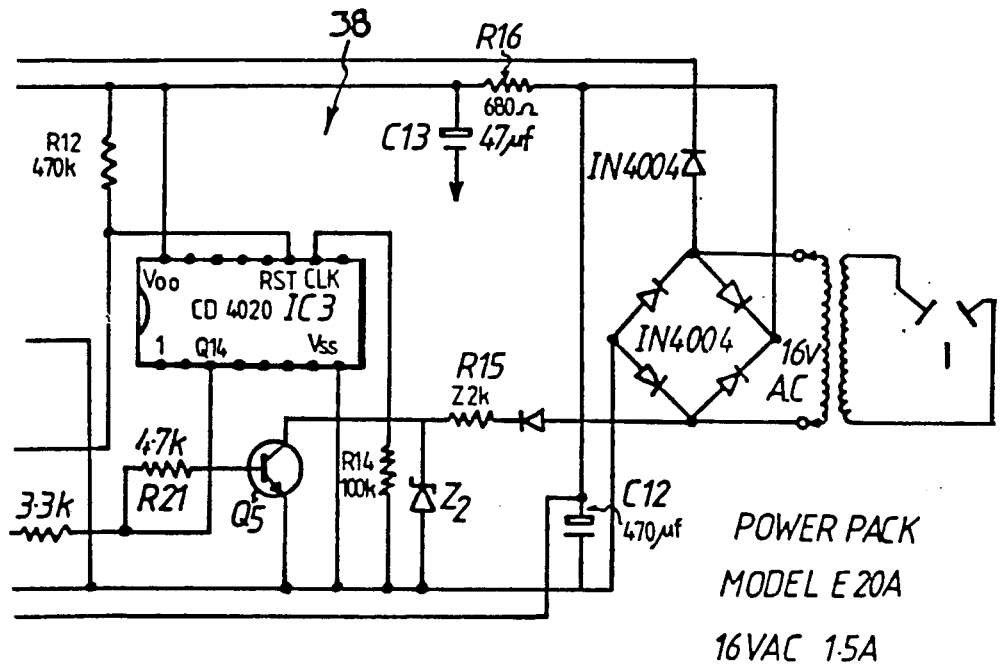

It is certified that error appears in the above-identified patent and that said Letters Patent is hereby corrected as shown below:

In Column 3, line 47, "FIG. 3 is" should read -- FIGS. 3A and 3B are --.

In Column 4, line 41, "FIG. 3 as" should read -- FIGS. 3A and 3B are --.

Signed and Sealed this

Twenty-sixth Day of January, 1988

Attest:

DONALD J. QUIGG

*Attesting Officer*  *Commissioner of Patents and Trademarks*